(12) United States Patent
Chen

(10) Patent No.: US 11,412,153 B2
(45) Date of Patent: *Aug. 9, 2022

(54) MODEL-BASED METHOD FOR CAPTURING IMAGES, TERMINAL, AND STORAGE MEDIUM

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 236 days.

This patent is subject to a terminal disclaimer.

(21) Appl. No.: 16/846,054

(22) Filed: Apr. 10, 2020

(65) Prior Publication Data

US 2020/0244865 A1  Jul. 30, 2020

Related U.S. Application Data

(63) Continuation of application No. PCT/CN2018/114423, filed on Nov. 7, 2018.

(30) Foreign Application Priority Data

Nov. 13, 2017  (CN) .......................... 201711117449.6

(51) Int. Cl.
  *H04N 5/235* (2006.01)
  *G06T 5/50* (2006.01)
  *H04N 5/232* (2006.01)

(52) U.S. Cl.
  CPC ............ *H04N 5/2355* (2013.01); *G06T 5/50* (2013.01); *H04N 5/2353* (2013.01);
  (Continued)

(58) Field of Classification Search
  CPC ............. H04N 5/2355; H04N 5/23229; H04N 5/2353; H04N 5/35536
  See application file for complete search history.

(56) References Cited

U.S. PATENT DOCUMENTS 8,446,481 B1    5/2013  Geiss
9,723,200 B2 *  8/2017  Kanumuri ............ H04N 5/2355
(Continued)

FOREIGN PATENT DOCUMENTS

CN    101399925    4/2009
CN    101426091    5/2009
(Continued)

OTHER PUBLICATIONS

WIPO, ISR for PCT/CN2018/114423, Jan. 30, 2019.
(Continued)

*Primary Examiner* — John Villecco
(74) *Attorney, Agent, or Firm* — Hodgson Russ LLP

(57) ABSTRACT

A method for capturing images, a terminal, and a computer-readable storage medium are provided, relating to the technical filed of electronics. The method includes the following. A preview image is acquired through a capturing component of a terminal and an exposure parameter value corresponding to the preview image is acquired. An image capturing parameter value in a current high dynamic range (HDR) scene is forecasted according to the preview image, the exposure parameter value, and an image capturing parameter related pre-trained forecasting model with an image data parameter, an exposure parameter, and an image capturing parameter as variables, where the image capturing parameter includes the number of images for synthesis. An image is captured according to the image capturing parameter value forecasted, upon receiving a capturing instruction.

20 Claims, 14 Drawing Sheets

(52) U.S. Cl.
CPC ..... *H04N 5/23216* (2013.01); *H04N 5/23229* (2013.01); *G06T 2207/20208* (2013.01)

(56) References Cited

U.S. PATENT DOCUMENTS

| | | | |
|---|---|---|---|
| 11,102,397 B2 * | 8/2021 | Chen | H04N 5/23229 |
| 11,146,739 B2 * | 10/2021 | Chen | H04N 5/23229 |
| 2009/0244301 A1 | 10/2009 | Border et al. | |
| 2010/0246940 A1 * | 9/2010 | Lin | G06T 5/009 382/274 |
| 2010/0259636 A1 | 10/2010 | Tzur et al. | |
| 2012/0249844 A1 * | 10/2012 | Saito | H04N 5/2355 348/222.1 |
| 2014/0055638 A1 * | 2/2014 | Son | H04N 5/2625 348/229.1 |
| 2014/0218559 A1 | 8/2014 | Yamaguchi et al. | |
| 2014/0240549 A1 * | 8/2014 | Seshadrinathan | H04N 5/2353 348/239 |
| 2014/0285698 A1 * | 9/2014 | Geiss | H04N 5/232935 348/333.05 |
| 2015/0124147 A1 | 5/2015 | Lee | |
| 2016/0112630 A1 * | 4/2016 | Kanumuri | H04N 5/23222 348/222.1 |
| 2017/0054895 A1 | 2/2017 | Wan et al. | |
| 2017/0163903 A1 * | 6/2017 | Wang | H04N 5/2356 |
| 2018/0343399 A1 * | 11/2018 | Lull | H04N 1/3871 |
| 2019/0096046 A1 * | 3/2019 | Kalantari | G06T 5/008 |
| 2020/0134787 A1 * | 4/2020 | Bouzaraa | G06T 5/50 |
| 2020/0244869 A1 * | 7/2020 | Chen | H04N 5/23229 |
| 2021/0035273 A1 * | 2/2021 | Deng | G06T 5/009 |

FOREIGN PATENT DOCUMENTS

| | | | |
|---|---|---|---|
| CN | 101909150 | | 12/2010 |
| CN | 103327221 | | 9/2013 |
| CN | 103413285 | | 11/2013 |
| CN | 103455170 | | 12/2013 |
| CN | 101859430 B | * | 1/2014 |
| CN | 103747189 | | 4/2014 |
| CN | 105635559 | | 6/2016 |
| CN | 105827754 | | 8/2016 |
| CN | 105827971 | | 8/2016 |
| CN | 106454096 | | 2/2017 |
| CN | 106657798 | | 5/2017 |
| CN | 106895916 | | 6/2017 |
| CN | 107169507 | | 9/2017 |
| CN | 107172296 | | 9/2017 |
| CN | 107205120 | | 9/2017 |
| CN | 107231530 | | 10/2017 |
| CN | 107809591 | | 3/2018 |
| CN | 107809592 | | 3/2018 |
| EP | 2043361 A1 | | 4/2009 |
| WO | 2013109261 A1 | | 7/2013 |
| WO | 2016061011 | | 4/2016 |
| WO | 2016197307 | | 12/2016 |

OTHER PUBLICATIONS

IPI, Office Action for IN Application No. 202017017942, dated May 17, 2021.
EPO, Extended European Search Report for EP 18875585.4, dated Dec. 8, 2020.
Li et al., "Research Progress of High Resolution and High Dynamic Range Image Joint Reconstruction," TT&C Technology, 2012, vol. 31, No. 5, pp. 8-13.
SIPO, First Office Action for CN Application No. 201711117449.6, dated Mar. 21, 2019.
SIPO, First Office Action for CN Application No. 201910888644.1, dated Aug. 5, 2020.
WIPO, International Search Report and Written Opinion for PCT/CN2018/115227, dated Jan. 30, 2019.
CNIPA, First Office Action for CN Application No. 201711117448.1, dated Apr. 26, 2019.
Gelfand et al., "Multi-exposure imaging on mobile devices," Proceedings of the 18th International Conference on Multimedia, 2010.
Likamwa et al., "Energy characterization and optimization of image sensing toward continuous mobile," International Conference on Mobile Systems, Applications and Services (MobiSys), 2013.
EPO, Extended European Search Report for EP Application No. 18877131.5, dated Nov. 18, 2020.

* cited by examiner

MODEL-BASED METHOD FOR CAPTURING IMAGES, TERMINAL, AND STORAGE MEDIUM

CROSS-REFERENCE TO RELATED APPLICATIONS

This application is a continuation of International Application No. PCT/CN2018/114423, filed Nov. 7, 2018, which claims priority to Chinese Patent Application No. 201711117449.6, filed Nov. 13, 2017, the entire disclosures of which are incorporated herein by reference.

TECHNICAL FIELD

This disclosure relates to the technical filed of electronics, and particularly to a method for capturing images, a terminal, and a storage medium.

BACKGROUND

With the development of electronic technology, terminals such as mobile phones and computers have been widely used, and applications on the terminals are becoming more diverse and feature-rich. The photography application is a common application, which can be used by users to take photos.

SUMMARY

According to a first aspect, a method for capturing images is provided. The method includes the following.

A preview image is acquired through a capturing component of a terminal and an exposure parameter value corresponding to the preview image is acquired. An image capturing parameter value in a current high dynamic range (HDR) scene is forecasted according to the preview image, the exposure parameter value, and an image capturing parameter related pre-trained forecasting model with an image data parameter, an exposure parameter, and an image capturing parameter as variables, where the image capturing parameter includes the number of images for synthesis. An image is captured according to the image capturing parameter value forecasted, upon receiving a capturing instruction.

According to a second aspect, a terminal is provided. The terminal includes at least one processor and a non-transitory computer readable storage. The computer readable storage is coupled to the at least one processor and stores at least one computer executable instruction thereon which, when executed by the at least one processor, causes the at least one processor to execute the method of the first aspect.

According to a third aspect, a non-transitory computer readable storage medium is provided in implementations. The non-transitory computer readable storage medium is configured to store a computer program which, when executed by a processor, causes the processor to execute the method of the first aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
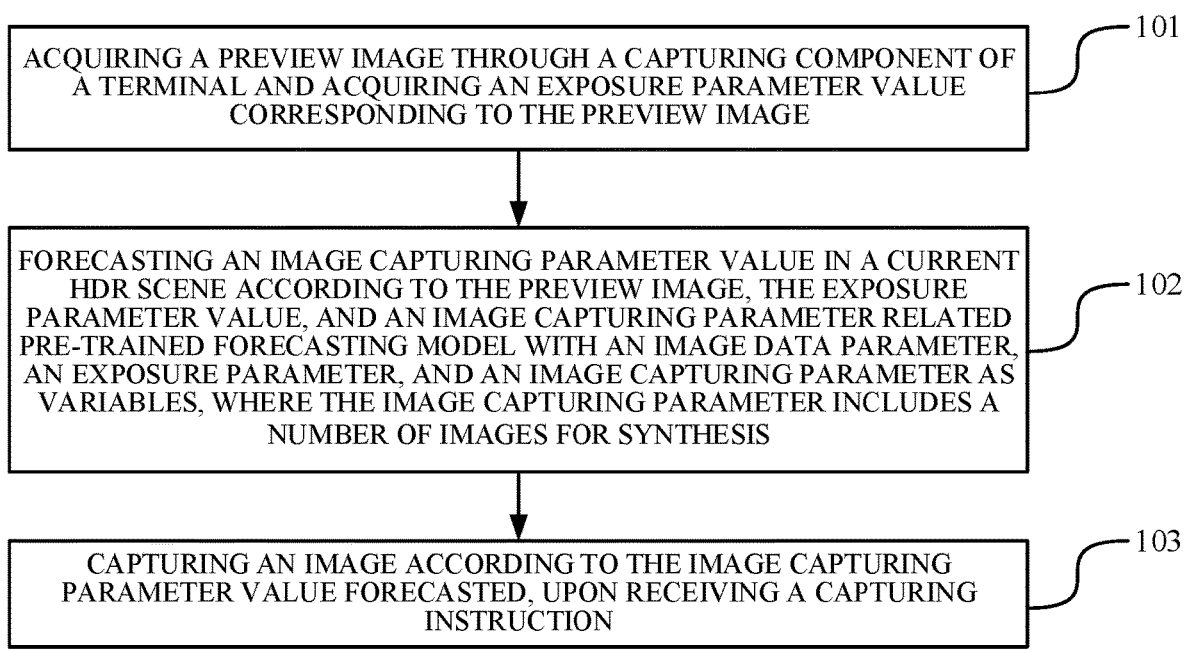
FIG. 1 is a flow chart illustrating a method for capturing images according to implementations.

To make objectives, technical solutions, and advantages of the present application clearer, implementations of the application will be described in further detail below with reference to the accompanying drawings.

First, terms related to this application are described.

Image capturing parameter related forecasting model (shortened as the forecasting model). The forecasting model is a mathematical model used to forecast or predict an image capturing parameter value in a current high dynamic range (HDR) scene according to input data.

The forecasting model includes but is not limited to at least one of a convolutional neural network (CNN) model, a deep neural network (DNN) model, a recurrent neural networks (RNN) model, an embedding model, a gradient boosting decision tree (GBDT) model, and a logistic regression (LR) model.

The CNN model is a network model used to identify the types of objects in images. The CNN model can also extract data features of labeled image data or unlabeled image data. CNN models include neural network models that can be trained with unlabeled image data and neural network models that cannot be trained with unlabeled image data.

The DNN model is a deep learning framework. The DNN model includes an input layer, at least one hidden layer (or intermediate layer), and an output layer. In an example, the input layer, the at least one hidden layer (or the intermediate layer), and the output layer each include at least one neuron, and the neuron is used to process received data. In an example, the number of neurons between different layers can be the same or different.

The RNN model is a neural network model with a feedback structure. In the RNN model, the output of a neuron can be directly applied to itself at the next timestamp, that is, the input of the neuron in the i-th layer at time m includes the output of the neuron in the (i−1)-th layer at time m as well as its own output at time (m−1).

The embedding model is the entities and relationships based distributed vector representation, where the relationship in each triplet instance is treated as a translation from the entity head to the entity tail. Among them, the triplet instance includes subject, relationship, and object, and the triplet instance can be expressed as (subject, relationship, object). The subject is the entity head and the object is the entity tail. For example, "Xiao Zhang's dad is Da Zhang" can be represented by a triplet instance (Xiao Zhang, Dad, Da Zhang).

The GBDT model is an iterative decision tree algorithm. The algorithm includes multiple decision trees, and the results of all trees are added up as the final result. Each node of the decision tree will get a forecasted value. Taking age as an example, the forecasted value is the average age of all people who belong to the node corresponding to the age.

The LR model refers to a model established by applying a logical function on the basis of linear regression.

A method for capturing images is provided in this application. The method is executed by a terminal. The terminal can be a terminal having an image capturing function, for example, a terminal installed with a photography application. The terminal can include components such as a processor, a memory, a capturing component, and a screen. The processor can be a CPU (central processing unit) or the like, and can be used to determine an image capturing parameter value(s) and perform related processing of image capturing. The memory can be RAM (random access memory), Flash, and so on, and can be used to store received data, data required for processing, and data generated during processing, such as an image capturing parameter related forecasting model. The capturing component can be a camera, which can be used to obtain a preview image. The screen can be a touch screen, which can be used to display a preview image acquired by the capturing component and can also be used to detect a touch signal and the like.

In related art, when a user takes photos using the photography application, in order to facilitate the user to obtain a clearer image in a backlit scene, the photography application can also provide an HDR function. In an example, when the user wants to use the HDR function, the user can find a switch button of the HDR function, and then click the switch button to turn on the HDR function. When the user presses a shutter button, the terminal can capture an image based on the preset number of images for synthesis. In an example, the terminal can continuously capture images the quantity of which is equal to the preset number of images for synthesis through the capturing component (such as a camera), where each image can be referred to as a preview image. Thereafter, the terminal performs image synthesis on the images captured to obtain a synthesized image, that is, obtain an image synthesized by multiple preview images, which is then stored in an album of the terminal. Based on the above, whenever a user wants to use the HDR function, the user needs to find the switch button of the HDR function, and then manually click the switch button, thereby causing a problem of low efficiency of taking photos.

Implementations provide a method for capturing images. The method includes the following.

A preview image is acquired through a capturing component of a terminal and an exposure parameter value corresponding to the preview image is acquired. An image capturing parameter value in a current high dynamic range (HDR) scene is forecasted according to the preview image, the exposure parameter value, and an image capturing parameter related pre-trained forecasting model with an image data parameter, an exposure parameter, and an image capturing parameter as variables, where the image capturing parameter includes the number of images for synthesis. An image is captured according to the image capturing parameter value forecasted, upon receiving a capturing instruction.

In at least one implementation, the image capturing parameter further includes an exposure parameter.

In at least one implementation, the following is further conducted. The forecasting model is trained in such a manner that a forecasted value of an image capturing parameter value corresponding to a preview image and an exposure parameter value approaches a pre-stored training value of the image capturing parameter value, to obtain the pre-trained forecasting model with the image data parameter, the exposure parameter, and the image capturing parameter as variables, where the forecasting model is trained according to a pre-stored correspondence relationship between preview images, exposure parameter values, and image capturing parameter values in a training set.

In at least one implementation, the following is further conducted.

A first preview image is acquired through the capturing component, and a first exposure parameter value corresponding to the first preview image is acquired.

Determine a first preset number of exposure parameter values and a second preset number of exposure parameter values according to the first exposure parameter value, a first preset number of attenuation percentages, and a second preset number of enhancement percentages.

A first preset number of preview images are obtained through the capturing component according to each of the first preset number of exposure parameter values, and a second preset number of preview images are obtained through the capturing component according to each of the second preset number of exposure parameter values.

For each of multiple preset numbers of images for synthesis stored in advance, select the first preview image and select, from the first preset number of preview images and the second preset number of preview images, preview images the quantity of which is equal to the preset number minus one, to obtain a target preview image set corresponding to the preset number and at least one exposure parameter value, where the at least one exposure parameter value is selected from the first preset number of exposure parameter values and the second preset number of exposure parameter values, and image synthesis is performed on the target preview image set to obtain a synthesized image corresponding to the preset number and the at least one exposure parameter value.

Determine, from synthesized images, a target synthesized image with the best image quality, and determine a target preset number and at least one target exposure parameter value corresponding to the target synthesized image as target image capturing parameter values.

The first preview image, the first exposure parameter value, and the target image capturing parameter values are stored into the training set correspondingly.

In at least one implementation, the image synthesis is performed on the target preview image set to obtain the synthesized image corresponding to the preset number and the at least one exposure parameter value as follows.

The image synthesis is performed on the target preview image set based on multiple preset terminal performance parameter values, to obtain a synthesized image corresponding to the preset number of images for synthesis, the at least one exposure parameter value, and each of the multiple preset terminal performance parameter values.

Determine, from the synthesized images, the target synthesized image with the best image quality, and determine the target preset number and the at least one target exposure parameter value corresponding to the target synthesized image as the target image capturing parameter values as follows.

Determine, from the synthesized images, the target synthesized image with the best image quality, and determine the target preset number of images for synthesis, the at least one target exposure parameter value, and a target preset terminal performance parameter value corresponding to the target synthesized image as the target image capturing parameter values.

In at least one implementation, the following is conducted.

Record a power consumption value of power consumed when the synthesized image corresponding to the preset number and the at least one exposure parameter value is obtained.

Determine, from the synthesized images, the target synthesized image with the best image quality, and determine the target preset number and the at least one target exposure parameter value corresponding to the target synthesized image as the target image capturing parameter values as follows.

Determine, from the synthesized images, a target synthesized image which is optimal in terms of both image quality and power consumption value, and determine a target preset number and at least one target exposure parameter value corresponding to the target synthesized image which is optimal in terms of both image quality and power consumption value as the target image capturing parameter values.

The following will describe procedures illustrated in FIG. 1 in detail in combination with implementations, and the content can be as follows.

At 101, a preview image is acquired through a capturing component of a terminal and an exposure parameter value corresponding to the preview image is acquired.

The exposure parameter value corresponding to the preview image can be an exposure parameter value determined when the preview image is acquired.

In an example, the capturing component is enabled after a photography application in the terminal is started. The preview image is an image acquired by the capturing component.

The exposure parameter value is a parameter value of an exposure parameter, and the exposure parameter value includes at least one of an exposure duration, a white balance, a shutter value, an aperture value, and a sensitivity. In an example, the terminal is installed with the photography application. When the user wants to take photos, the user will click the icon of the photography application. At this point, the terminal will receive a corresponding start instruction of the photography application, and then start the photography application. In such case, the terminal will be framing (in other words, in a state ready for image capturing), that is, the capturing component in the terminal is enabled at this time. When the capturing component is enabled, the terminal acquires the preview image through the capturing component.

The preview image can be an image displayed in the terminal acquired by the capturing component, that is, an image that has not subjected to image synthesis or image composite. In other words, the preview image can be an image acquired by the capturing component before the user presses the shutter button. In addition, after the photography application is started, the terminal can determine in real time the exposure parameter value (which can include parameter values such as the exposure duration and the white balance) according to the ambient brightness and the color of the light source in the environment, so that the terminal can capture an image according to the exposure parameter value. In this case, while the terminal obtains the preview image through the capturing component, the terminal can also obtain the exposure parameter value corresponding to the preview image, that is, the exposure parameter value used for taking the preview image.

In an example, the terminal acquires the preview image through the capturing component in real time or every acquisition period.

The acquisition period is set by the user or is set by the terminal by default, which is nor limited herein.

In addition, the acquisition period can be set in the terminal. When the capturing component is enabled, the terminal can acquire the preview image through the capturing component and acquire the exposure parameter value corresponding to the preview image in every preset acquisition period.

At 102, an image capturing parameter value in a current high dynamic range (HDR) scene is forecasted according to the preview image, the exposure parameter value, and an image capturing parameter related pre-trained forecasting model with an image data parameter, an exposure parameter, and an image capturing parameter as variables, where the image capturing parameter includes the number of images for synthesis.

The terminal pre-stores the image capturing parameter related pre-trained forecasting model (shortened as forecasting model).

The forecasting model can be used to forecast the image capturing parameter value in the current scene according to the preview image and the exposure parameter value corresponding to the preview image currently acquired by the terminal. After the preview image and the exposure parameter value corresponding to the preview image are obtained, the terminal can input the preview image and its corresponding exposure parameter value into the pre-trained forecasting model to obtain an output of the forecasting model, that is, obtain the image capturing parameter value in the current scene. In one example, after the preview image and the exposure parameter value corresponding to the preview image are obtained, the terminal can use the preview image as a parameter value of the image data parameter, use the exposure parameter value corresponding to the preview image as a parameter value of the exposure parameter, and input them into the forecasting model to obtain the image capturing parameter value in the current HDR scene, obtaining the number of images for synthesis.

In an example, the forecasting model is a model obtained by training the convolutional neural network using a correspondence relationship between each preview image, exposure parameter value, and image capturing parameter value in a training set.

In an example, the above forecasting model is pre-trained by a terminal or a server. The following describes that the forecasting model is trained by the terminal as an example to introduce the training process of the forecasting model.

In an example, the terminal acquires a training set, where the training set includes at least one set of sample data. According to the at least one set of sample data, an original parameter model is trained by using an error back propagation algorithm to obtain the forecasting model. Each set of sample data includes the correspondence relationship between preview images, exposure parameter values, and image capturing parameter values.

The training process can be as follows. According to the correspondence relationship between each preview image, exposure parameter value, and image capturing parameter value pre-stored in the training set, the forecasting model is trained in such a manner that a forecasted value of an image capturing parameter value corresponding to a preview image and an exposure parameter value approaches a pre-stored training value of the image capturing parameter value, to obtain the pre-trained forecasting model with the image data parameter, the exposure parameter, and the image capturing parameter as variables. In an example, the terminal stores the training set in advance. The training set can include the correspondence relationship between each preview image, exposure parameter value, and image capturing parameter value. The image capturing parameter value in each correspondence item in the correspondence relationship can be a value of the image capturing parameter that can optimize the quality of the synthesized image in the scene expressed by the preview image and the exposure parameter value in the correspondence item. The terminal can train the forecasting model associated with a pending parameter(s) (parameter to be determined) according to the training set stored in advance. That is, the terminal trains the forecasting model in such a manner that an image capturing parameter value that corresponds to a preview image and an exposure parameter value and is forecasted by the forecasting model approaches a pre-stored training value of an image capturing parameter value corresponding to the preview image and the exposure parameter value. For each correspondence item in the correspondence relationship between preview images, exposure parameter values, and image capturing parameter values, the terminal can input the preview image and the exposure parameter value in the correspondence item into the forecasting model associated with the pending parameter, to obtain the image capturing parameter value of the pending parameter. Furthermore, an objective function is obtained by approximating the obtained image capturing parameter value of the pending parameter to a training value of the image capturing parameter value in the correspondence item. For example, the objective function can be a function obtained by subtracting the image capturing parameter value in the correspondence item from the obtained image capturing parameter value of the pending parameter. After the objective function is obtained, the gradient descent method can be applied to obtain a training value of the pending parameter, and assign this training value to a parameter value corresponding to the pending parameter when training according to the next correspondence item. By analogy, after the training is completed, the final training value of the pending parameter can be obtained. In addition, the above forecasting model can be a convolutional neural network model. In this case, the pending parameter can be each convolution kernel in the neural network model.

In an example, each correspondence item in the correspondence relationship is selected according to the image quality of the synthesized image corresponding to the preset number of images for synthesis and the at least one exposure parameter value. In at least one implementation, the process is as follows. The image capturing parameter further includes an exposure parameter. A first preview image is acquired through the capturing component, and a first exposure parameter value corresponding to the first preview image is acquired. Determine a first preset number of exposure parameter values and a second preset number of exposure parameter values according to the first exposure parameter value, a first preset number of attenuation percentages (or attenuation rates), and a second preset number of enhancement percentages (or enhancement rates). A first preset number of preview images are obtained through the capturing component according to each of the first preset number of exposure parameter values, and a second preset number of preview images are obtained through the capturing component according to each of the second preset number of exposure parameter values. For each of multiple preset numbers of images for synthesis stored in advance, select the first preview image and select, from the first preset number of preview images and the second preset number of preview images, preview images the quantity of which is equal to the preset number of images for synthesis minus one, to obtain a target preview image set corresponding to the preset number of images for synthesis and at least one exposure parameter value, where the at least one exposure parameter value is selected from the first preset number of exposure parameter values and the second preset number of exposure parameter values, and image synthesis (or image composite) is performed on the target preview image set to obtain a synthesized image (or a composite image) corresponding to the preset number of images for synthesis and the at least one exposure parameter value. Determine, from synthesized images, a target synthesized image with the best image quality, and determine a target preset number of images for synthesis and at least one target exposure parameter value corresponding to the target synthesized image as target image capturing parameter values. The first preview image, the first exposure parameter value, and the target image capturing parameter values are stored into the training set correspondingly.

Each correspondence item in the correspondence relationship is determined by the terminal according to the acquired first preview image and preview images corresponding to the preset number of different exposure parameter values. Different correspondence items are determined by the terminal respectively according to the first preview image and the preset number of preview images obtained in different HDR scenes.

In each correspondence item in the correspondence relationship, for each correspondence item whose number of images for synthesis included in the corresponding image capturing parameter is one, the exposure parameter value included in the image capturing parameter value can be a preset value (for example, 0); for each correspondence item whose number of images for synthesis included in the corresponding image capturing parameter is greater than one, the exposure parameter value included in the image capturing parameter value can be an exposure parameter value of the first preset number of exposure parameter values and the second preset number of exposure parameter values determined according to the first exposure parameter value. The following describes how a certain correspondence item is determined in detail, and how other correspondence items are determined is similar.

In the HDR scene, the terminal can acquire a preview image (which can be called the first preview image) through the capturing component, where the preview image is directly acquired by the capturing component and has not been subjected to image synthesis. Thereafter, the terminal can acquire an exposure parameter value (which can be called the first exposure parameter value) corresponding to the first preview image, where the first exposure parameter value is determined by the terminal according to the ambient brightness and the color of the light source in the environment and is not adjusted. The terminal can store the first preset number of attenuation percentages (where the attenuation percentage can be a percentage less than one) and the second preset number of enhancement percentages (where the enhancement percentage can be a percentage greater than one) in advance. The first preset number can be the same as or different from the second preset number. After the first exposure parameter value corresponding to the first preview image is obtained, each of the first preset number of attenuation percentages can be multiplied by the first exposure parameter value to obtain the first preset number of exposure parameter values, and each of the second preset number of enhancement percentages can be multiplied by the first exposure parameter value to obtain the second preset number of exposure parameter values. For example, in the case that the first preset number of attenuation percentages are 80% and 60% and the first exposure parameter value is A, the first preset number of exposure parameter values are A*80% and A*60%. In the case that the second preset number of enhancement percentage is 110% and the first exposure parameter value is A, the second preset number of exposure parameter value is A*110%. After the first preset number of exposure parameter values are obtained, a preview image is acquired through the capturing component according to each of the first preset number of exposure parameter values to obtain the first preset number of preview images, and a preview image is acquired through the capturing component according to each of the second preset number of exposure parameter values to obtain the second preset number of preview images. That is, the first preset number of preview images and the second preset number of preview images are obtained based on the adjusted exposure parameter values and are not determined according to the ambient brightness and the color of the light source in the environment.

The terminal can pre-store multiple preset numbers of images for synthesis (which can be 1, 2, or 3). After the first preview image, the first preset number of preview images, and the second preset number of preview images are obtained, in the case that the preset number of images for synthesis is 1 (N=1), the first preview image is determined as a target preview image set corresponding to N=1. An exposure parameter value corresponding to a synthesized image (or a merged image) obtained from performing image synthesis on the target preview image set (or from merging the target preview image set) can be a preset value. In the case that the preset number of images for synthesis is 2 (N=2), select the first preview image and a preview image from the first preset number of preview images, to obtain a target preview image set corresponding to N=2 and one of the first preset number of exposure parameter values, and select the first preview image and a preview image from the second preset number of preview images, to obtain a target preview image set corresponding to N=2 and one of the second preset number of exposure parameter values. That is, when N=2, for a preview image corresponding to each of the first preset number of exposure parameter values, select the first preview image and this preview image, to obtain the target preview image set corresponding to N=2 and each of the first preset number of exposure parameter values. When N=2, for a preview image corresponding to each of the second preset number of exposure parameter values, select the first preview image and this preview image, to obtain the target preview image set corresponding to N=2 and each of the second preset number of exposure parameter values. In the case that the preset number of images for synthesis is 3 (N=3), select the first preview image, a preview image from the first preset number of preview images, and a preview image from the second preset number of preview images, to obtain a target preview image set corresponding to N=3, one of the first preset number of exposure parameter values, and one of the second preset number of exposure parameter values.

Figure 2:
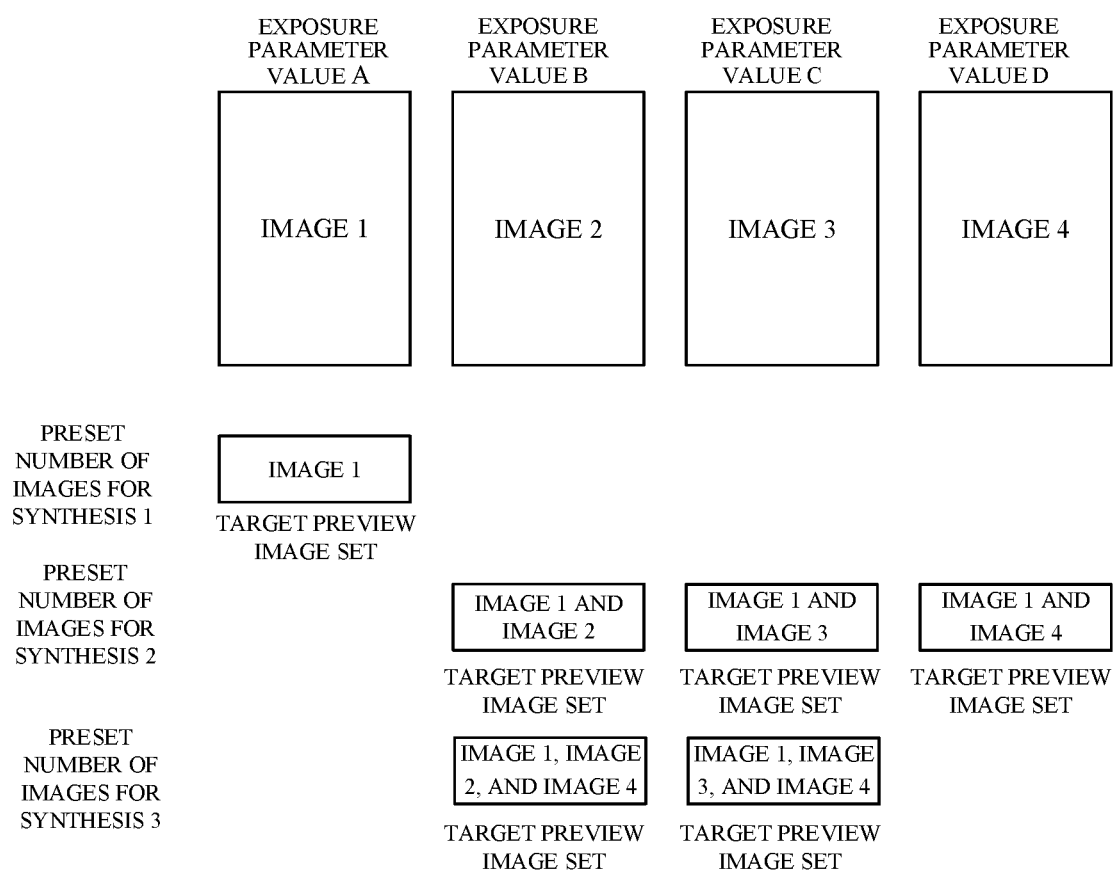
FIG. 2 is a schematic diagram illustrating target preview image sets corresponding to multiple preset numbers of images for synthesis and multiple exposure parameter values according to implementations.

For example, the terminal obtains the following data. The first preview image is image 1 and the first exposure parameter value is A. The first preset number of preview images are image 2 and image 3, where image 2 has an exposure parameter value of B and image 3 has an exposure parameter value of C. The second preset number of preview image is image 4, where image 4 has an exposure parameter value of D. The multiple preset numbers of images for synthesis are 1, 2, and 3. When the preset number of images for synthesis is 1 (i.e., preset number of images for synthesis 1 or N=1), the terminal can select image 1, and a target preview image set corresponding to N=1 is obtained. When the preset number of images for synthesis is 2 (i.e., preset number of images for synthesis 2 or N=2), the terminal can select image 1 and image 2, and a target preview image set corresponding to N=2 and exposure parameter value B is obtained. The terminal can further select image 1 and image 3, and a target preview image set corresponding to N=2 and exposure parameter value C is obtained. The terminal can further select image 1 and image 4, and a target preview image set corresponding to N=2 and exposure parameter value D is obtained. When the preset number of images for synthesis is 3 (i.e., preset number of images for synthesis 3 or N=3), the terminal can select image 1, image 2, and image 4, and a target preview image set corresponding to the N=3, exposure parameter value B, and exposure parameter value D is obtained. The terminal can further select image 1, image 3, and image 4, and a target preview image set corresponding to the N=3, exposure parameter value C, and exposure parameter value D is obtained. The above is illustrated in FIG. 2.

For each of the multiple preset numbers of images for synthesis stored in advance, after the target preview image set corresponding to the preset number of images for synthesis and the exposure parameter values is obtained, image synthesis can be performed on the target preview image set. That is, image synthesis can be performed on each preview image in the target preview image set, to obtain a synthesized image corresponding to the preset number of images for synthesis and the exposure parameter values. After all synthesized images are obtained, calculate image quality (for example, definition) corresponding to each synthesized image. Thereafter, determine from all the synthesized images a synthesized image with the best image quality (which can be called a target synthesized image), and then determine the preset number of images for synthesis (the target preset number of images for synthesis) and at least one exposure parameter value (which can be called at least one target exposure parameter value) corresponding to the target synthesized image. In the case that the target preset number of images for synthesis is 1, the target exposure parameter value is a preset value (such as 0). In the case that the target preset number of images for synthesis is greater than 1, the at least one target exposure parameter value is at least one exposure parameter value of the first preset number of exposure parameter values and/or the second preset number of exposure parameter values. After the target preset number of images for synthesis and the at least one target exposure parameter value are determined, they are determined as target image capturing parameter values. Thereafter, the first preview image, the first exposure parameter value, and the target image capturing parameter values are stored into the training set correspondingly. For other HDR scenes, the terminal can obtain the corresponding preview image, exposure parameter value, and image capturing parameter values according to the above process, to obtain correspondence items in the training set.

In an example, the image capturing parameter further includes a terminal performance parameter. Correspondingly, when the training set is determined, the preview image, and the preset number of images for synthesis and a terminal performance parameter value corresponding to the image capturing parameter are determined. In at least one implementation, the terminal can perform the image synthesis on the target preview image set based on multiple preset terminal performance parameter values, to obtain a synthesized image corresponding to the preset number of images for synthesis, the at least one exposure parameter value, and each of the multiple preset terminal performance parameter values. In at least one implementation, the terminal can determine, from the synthesized images corresponding to the multiple preset numbers of images for synthesis, multiple exposure parameter values, and the multiple preset terminal performance parameter values, the target synthesized image with the best image quality, and determine the target preset number of images for synthesis, the at least one target exposure parameter value, and a target preset terminal performance parameter value corresponding to the target synthesized image as the target image capturing parameter values.

In an example, the terminal performance parameter value is a parameter value of the terminal performance parameter. The terminal performance parameter is a parameter that affects performance of the terminal. For example, the terminal performance parameter is the CPU operating frequency (also called the CPU clock speed).

Figure 3:
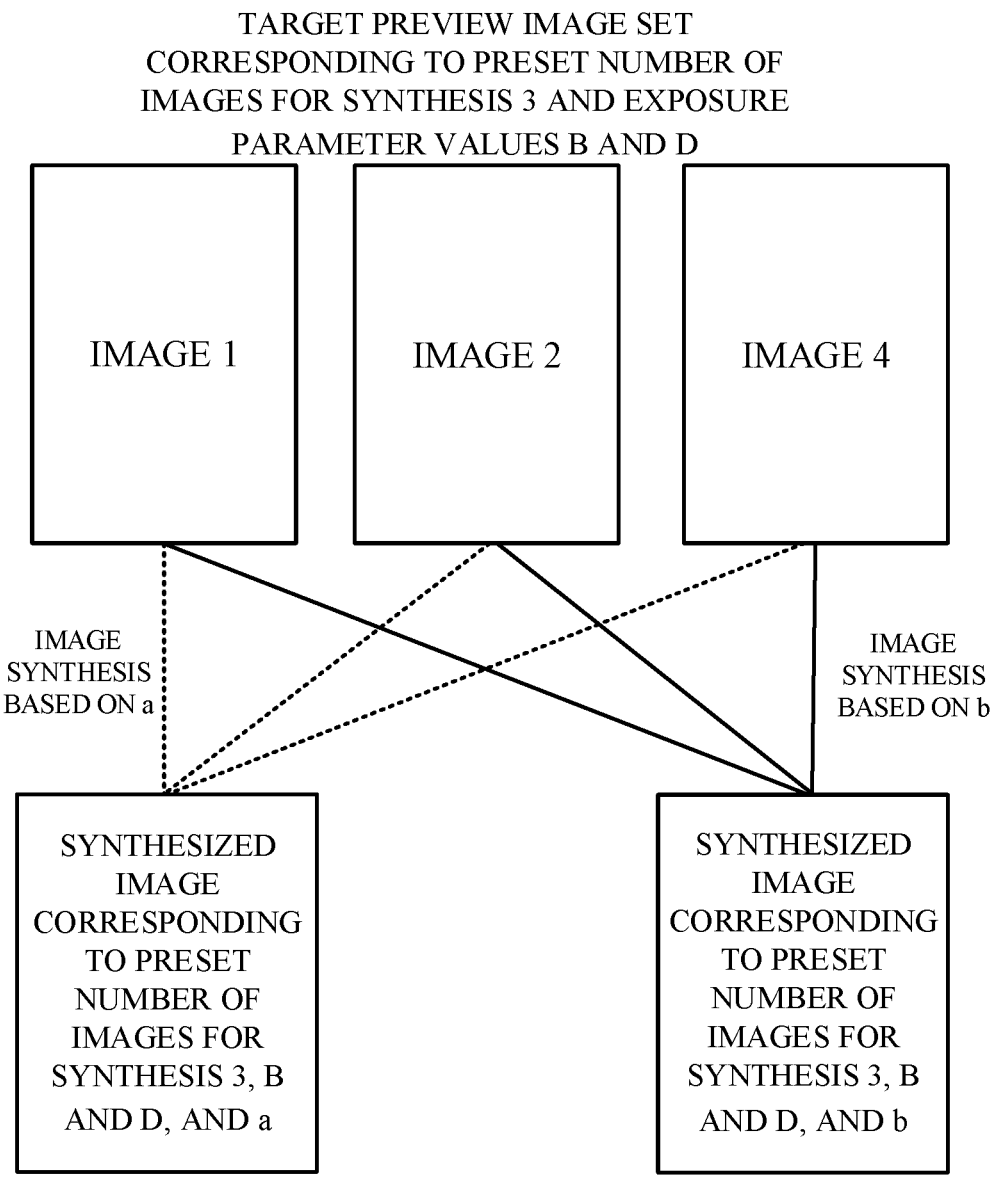
FIG. 3 is a schematic diagram illustrating synthesized images corresponding to the preset number of images for synthesis, exposure parameter values, and multiple preset terminal performance parameter values according to implementations.

In an example, the terminal pre-stores multiple preset terminal performance parameter values. In the case that the image capturing parameter further includes the terminal performance parameter, for each of the multiple preset numbers of images for synthesis, after the target preview image set corresponding to the preset number of images for synthesis and the at least one exposure parameter value is determined, the terminal can perform image synthesis on the target preview image set based on each of the multiple preset terminal performance parameter values, to obtain the synthesized image corresponding to the preset number of images for synthesis, the at least one exposure parameter value, and each of the multiple preset terminal performance parameter values. For example, the preset number of images for synthesis is 3, the exposure parameter values are B and D, the multiple preset terminal performance parameter values are a and b. For a target preview image set corresponding to preset number of images for synthesis 3 and exposure parameter values B and D, in the case that the terminal performance parameter has a value of a (that is, the value of the terminal performance parameter is set to be a), the terminal can perform image synthesis on the target preview image set, to obtain a synthesized image corresponding to preset number of images for synthesis 3, exposure parameter values B and D, and terminal performance parameter value a. In the case that the terminal performance parameter has a value of b, the terminal can further perform image synthesis on the target preview image set, to obtain a synthesized image corresponding to preset number of images for synthesis 3, exposure parameter values B and D, and terminal performance parameter value b. The above are illustrated in FIG. 3.

After all the synthesized images are obtained, the image quality of each synthesized image is calculated and the target synthesized image with the best image quality is determined from all the synthesized images. The target preset number of images for synthesis, the at least one target exposure parameter value, and the target preset terminal performance parameter value corresponding to the target synthesized image are determined as the target image capturing parameter values. The first preview image, the first exposure parameter value, and the target image capturing parameter values are stored into the training set correspondingly.

The terminal adds the first preview image, the first exposure parameter value, and the target image capturing parameter values into the training set, to obtain an updated training set. The forecasting model is trained according to the updated training set, to obtain an updated forecasting model.

As to how the forecasting model is trained according to the updated training set to obtain the updated forecasting model, reference can be made to the above training process of the forecasting model, which is not limited herein.

In an example, when image synthesis is performed on each target preview image set, the terminal further records a power consumption value of power consumed each time. The terminal can determine the target image capturing parameter values as follows. Record a power consumption value of power consumed when the synthesized image corresponding to the preset number of images for synthesis and the at least one exposure parameter value is obtained. Determine, from the obtained multiple synthesized images corresponding to the multiple preset numbers of images for synthesis and multiple exposure parameter values, a target synthesized image which is optimal in terms of both image quality and power consumption value. Determine a target preset number of images for synthesis and at least one target exposure parameter value corresponding to the target synthesized image which is optimal in terms of both image quality and power consumption value as the target image capturing parameter values.

For each of the multiple preset numbers of images for synthesis stored in advance, after the target preview image set corresponding to the preset number of images for synthesis and the exposure parameter values is obtained, image synthesis can be performed on the target preview image set, to obtain the synthesized image corresponding to the preset number of images for synthesis and the exposure parameter values. Furthermore, the power consumption value of power consumed for image synthesis this time can be recorded. That is, record the power consumption value of power consumed for obtaining the synthesized image corresponding to the preset number of images for synthesis and the at least one exposure parameter value. The power consumption value can be one or more of the amount of power consumed and the length of time consumed. In this case, after all the synthesized images and corresponding power consumption values are obtained, the terminal can determine, from all the synthesized images obtained, the target synthesized image which is optimal in terms of both image quality and power consumption value. For example, a synthesized image with the largest quotient of image quality and power consumption value can be determined as the target synthesized image. The terminal further can determine the target preset number of images for synthesis and the at least one target exposure parameter value corresponding to the target synthesized image which is optimal in terms of both image quality and power consumption value as the target image capturing parameter values.

In addition, when image synthesis is performed on the target preview image set corresponding to preset number of images for synthesis 1, the first preview image in the target preview image set can be used as a synthesized image.

At 103, an image is captured according to the image capturing parameter value forecasted, upon receiving a capturing instruction.

When the capturing component is enabled and the user wants to take photos, the user can click the shutter button. At this time, the terminal will receive a click instruction of the shutter button, and then can capture an image according to the forecasted image capturing parameter values and an HDR synthesis algorithm in the current scene. The forecasted image capturing parameter values in the current HDR scene can be the values of image capturing parameters in the HDR synthesis algorithm. When the number of images for synthesis forecasted is 1, the terminal can acquire one preview image through the capturing component. In this case, the preview image acquired is the final synthesized image. That is, the HDR function is not enabled in this case. In an example, in the case that the image capturing parameter includes the number of images for synthesis, the terminal can obtain a second preview image, and shoot one preview image based on each of preset exposure parameter values (where the number of the preset exposure parameter values is equal to the number of images for synthesis minus one), to obtain preview images whose number is equal to the number of images for synthesis minus one. The terminal further can perform image synthesis on the acquired second preview image and the preview images to obtain the final image, and store it to the album. In an example, in the case that the image capturing parameter includes the number of images for synthesis and the terminal performance parameter, the terminal can obtain a second preview image, and photograph one preview image based on each of the preset exposure parameter values, to obtain preview images whose number is equal to the number of images for synthesis minus one. The terminal further can set a value of the terminal performance parameter to be a forecasted terminal performance parameter value, perform image synthesis on the acquired second preview image and the preview images based on the forecasted terminal performance parameter value to obtain the final image, and store it to the album. As a result, if the number of images for synthesis forecasted is 1, the terminal only acquires the second preview image and serve the second preview image as the final image to store it.

In addition, for the operation 101, in that case that the preview image is acquired through the capturing component and the exposure parameter value corresponding to the preview image is acquired in each preset acquisition period, when the preview image is acquired, the image capturing parameter values in the current HDR scene (that is, the image capturing parameter values corresponding to the current acquisition period) can be determined according to operation 102. When a capturing instruction is received in the current acquisition period, the terminal can capture an image according to the forecasted image capturing parameter values corresponding to the current acquisition period.

In an example, in the case that the image capturing parameter further includes the exposure parameter, the operation 103 is executed as follows. When the capturing instruction is received, a second preview image is acquired through the capturing component, and one preview image is acquired through the capturing component based on the forecasted each exposure parameter value. Thereafter, image synthesis is performed on the second preview image and the preview images to obtain the synthesized image.

In an example, the image capturing parameter further includes the exposure parameter. In this case, the input of the forecasting model can be the preview image and the exposure parameter value corresponding to the preview image, where the exposure parameter value is determined according to the ambient brightness and the color of the light source in the environment and is not adjusted, and the output of the forecasting model can be the forecasted number of images for synthesis and the forecasted exposure parameter value(s). The forecasted exposure parameter value can be used for the terminal to capture an image, and the forecasted exposure parameter value is less than the exposure parameter value corresponding to the preview image.

In an example, when the user starts the photography application and wants to take photos, the user can click the shutter button. In this case, the terminal will receive the capturing instruction, and then acquire the preview image (can be called the second preview image) through the capturing component and acquire the forecasted exposure parameter values whose number is equal to the forecasted number of images for synthesis minus one and the forecasted number of images for synthesis. The second preview image can be an image acquired by the terminal through the capturing component when the capturing instruction is received. After the forecasted exposure parameter values and the forecasted number of images for synthesis are acquired, the terminal can respectively assign the value of the exposure parameter to each forecasted exposure parameter value, and acquire one preview image through the capturing component based on each forecasted exposure parameter value, to obtain preview images whose number is equal to the forecasted number of images for synthesis minus one. Thereafter, image synthesis is performed on the second preview image and the preview images to obtain the synthesized image, and the synthesized image is stored into the album for the user to view. The terminal may not store the preview images obtained, that is, the user can not view the preview images, and the preview images are merely used to obtain the synthesized image. Consequently, if the number of images for synthesis is 1, the terminal only acquires the second preview image, and in this case the forecasted exposure parameter value is meaningless.

According to the implementations, the preview image is acquired through the capturing component and the exposure parameter value corresponding to the preview image is acquired; the image capturing parameter value in the current HDR scene is forecasted according to the preview image, the exposure parameter value, and the pre-trained forecasting model; an image is captured according to the image capturing parameter value forecasted upon receiving the capturing instruction. In this way, the terminal can automatically compute the number of images for synthesis in current HDR scene, and capture an image based on the number of images for synthesis, without requiring a user to manually turn on the HDR function, thereby improving the efficiency of taking photos.

Figure 4:
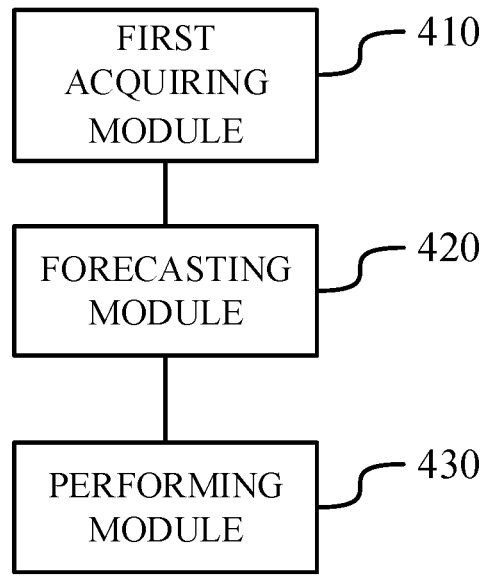
FIG. 4 is a schematic structural diagram illustrating a device for capturing images according to implementations.

Based on similar technical concept, implementations further provide a device for capturing images. As illustrated in FIG. 4, the device includes a first acquiring module 410, a forecasting module 420, and a performing module 430.

The first acquiring module 410 is configured to acquire a preview image through a capturing component of a terminal and acquire an exposure parameter value corresponding to the preview image. The forecasting module 420 is configured to forecast an image capturing parameter value in a current high dynamic range (HDR) scene according to the preview image, the exposure parameter value, and an image capturing parameter related pre-trained forecasting model with an image data parameter, an exposure parameter, and an image capturing parameter as variables, where the image capturing parameter includes the number of images for synthesis. The performing module 430 is configured to capture an image according to the image capturing parameter value forecasted, upon receiving a capturing instruction.

In at least one implementation, the image capturing parameter further includes an exposure parameter.

Figure 5:
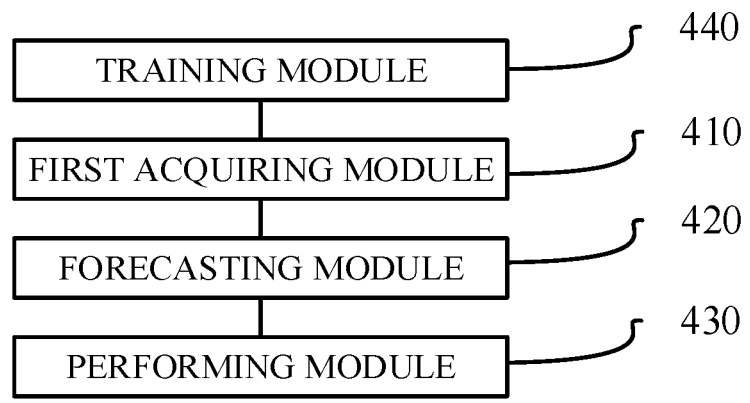
FIG. 5 is a schematic structural diagram illustrating a device for capturing images according to implementations.

In at least one implementation, as illustrated in FIG. 5, the device further a training module 440. The training module 440 is configured to train the forecasting model in such a manner that a forecasted value of an image capturing parameter value corresponding to a preview image and an exposure parameter value approaches a pre-stored training value of the image capturing parameter value, to obtain the pre-trained forecasting model with the image data parameter, the exposure parameter, and the image capturing parameter as variables, where the forecasting model is trained according to a pre-stored correspondence relationship between preview images, exposure parameter values, and image capturing parameter values in a training set.

Figure 6:
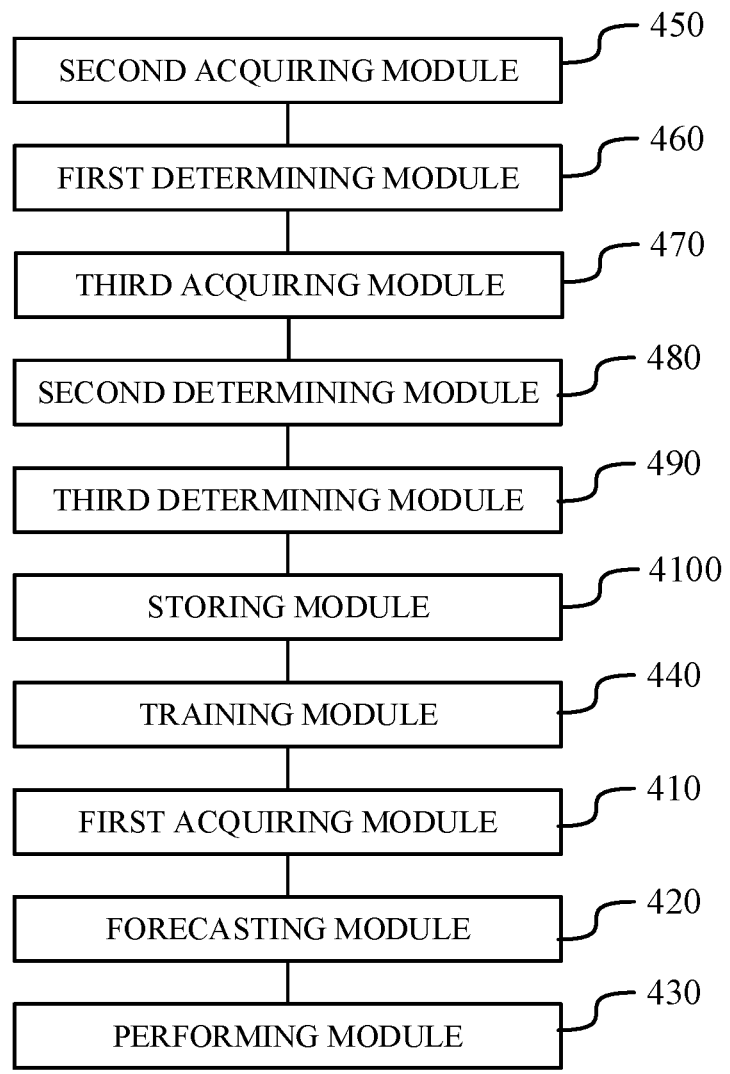
FIG. 6 is a schematic structural diagram illustrating a device for capturing images according to implementations.

In at least one implementation, as illustrated in FIG. 6, the device further includes a second acquiring module 450, a first determining module 460, a third acquiring module 470, a second determining module 480, a third determining module 490, and a storing module 4100.

The second acquiring module 450 is configured to acquire a first preview image through the capturing component and acquire a first exposure parameter value corresponding to the first preview image.

The first determining module 460 is configured to determine a first preset number of exposure parameter values and a second preset number of exposure parameter values according to the first exposure parameter value, a first preset number of attenuation percentages, and a second preset number of enhancement percentages.

The third acquiring module 470 is configured to obtain a first preset number of preview images through the capturing component according to each of the first preset number of exposure parameter values, and to obtain a second preset number of preview images through the capturing component according to each of the second preset number of exposure parameter values.

The second determining module 480 is configured to, for each of multiple preset numbers of images for synthesis stored in advance, select the first preview image and select, from the first preset number of preview images and the second preset number of preview images, preview images the quantity of which is equal to the preset number of images for synthesis minus one, to obtain a target preview image set corresponding to the preset number of images for synthesis and at least one exposure parameter value, where the at least one exposure parameter value is selected from the first preset number of exposure parameter values and the second preset number of exposure parameter values, and to perform image synthesis on the target preview image set to obtain a synthesized image corresponding to the preset number of images for synthesis and the at least one exposure parameter value.

The third determining module 490 is configured to determine, from synthesized images, a target synthesized image with the best image quality, and determine a target preset number of images for synthesis and at least one target exposure parameter value corresponding to the target synthesized image as target image capturing parameter values.

The storing module 4100 is configured to store the first preview image, the first exposure parameter value, and the target image capturing parameter values into the training set correspondingly.

In at least one implementation, the second determining module 480 is configured to: perform the image synthesis on the target preview image set based on multiple preset terminal performance parameter values, to obtain a synthesized image corresponding to the preset number of images for synthesis, the at least one exposure parameter value, and each of the multiple preset terminal performance parameter values. The third determining module 490 is configured to: determine, from the synthesized images, the target synthesized image with the best image quality, and determine the target preset number of images for synthesis, the at least one target exposure parameter value, and a target preset terminal performance parameter value corresponding to the target synthesized image as the target image capturing parameter values.

Figure 7:
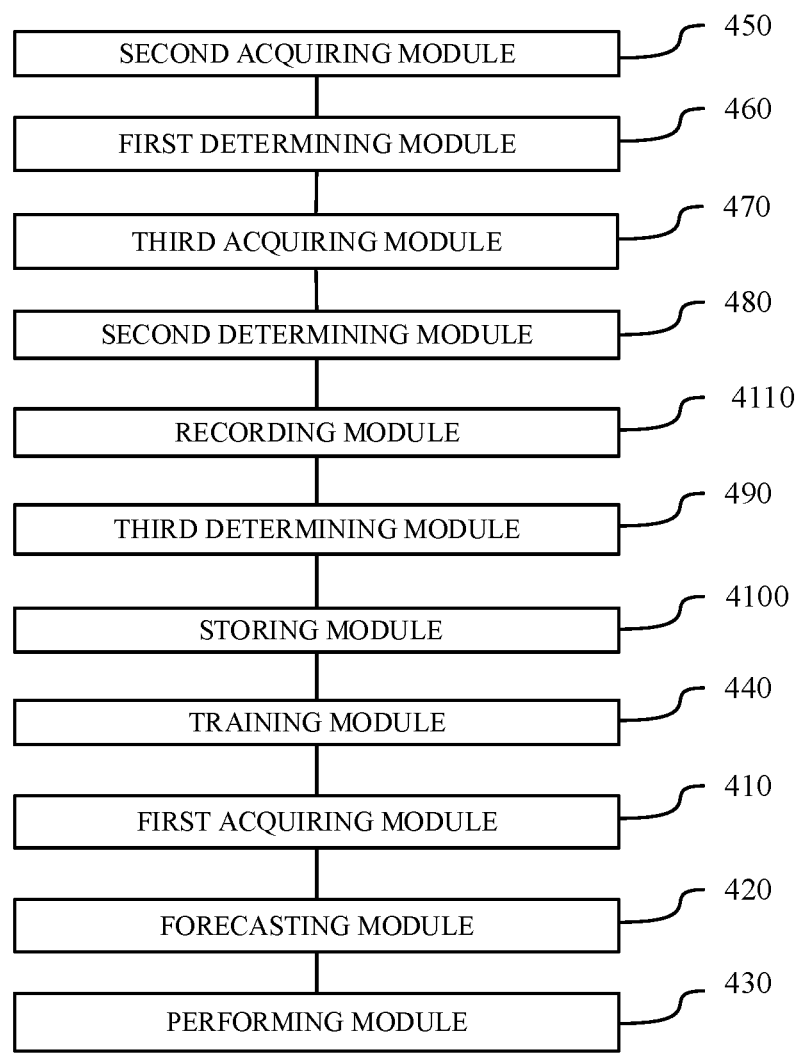
FIG. 7 is a schematic structural diagram illustrating a device for capturing images according to implementations.

In at least one implementation, as illustrated in FIG. 7, the device further includes a recording module 4110. The recording module 4110 is configured to record a power consumption value of power consumed when the synthesized image corresponding to the preset number of images for synthesis and the at least one exposure parameter value is obtained.

The third determining module 490 is configured to determine, from the synthesized images, a target synthesized image which is optimal in terms of both image quality and power consumption value, and determine a target preset number of images for synthesis and at least one target exposure parameter value corresponding to the target synthesized image which is optimal in terms of both image quality and power consumption value as the target image capturing parameter values.

According to the implementations, the preview image is acquired through the capturing component and the exposure parameter value corresponding to the preview image is acquired; the image capturing parameter value in the current HDR scene is forecasted according to the preview image, the exposure parameter value, and the pre-trained forecasting model, where the image capturing parameter includes the number of images for synthesis; an image is captured according to the image capturing parameter value forecasted upon receiving the capturing instruction. In this way, the terminal can automatically compute the number of images for synthesis in current HDR scene, and capture an image based on the number of images for synthesis, without requiring a user to manually turn on an HDR function, thereby improving the efficiency of taking photos.

When the device for capturing images of the foregoing implementation captures an image, only the division of the foregoing functional modules is used as an example for description. In practical applications, the above-mentioned functions can be allocated by different functional modules according to requirements. That is, the internal structure of the terminal is divided into different functional modules to complete all or part of the functions described above. In addition, the device for capturing images and the method for capturing images of the foregoing implementations belong to the same concept. For specific implementation processes, refer to the method implementation, and details are not described herein again.

According to implementations of the disclosure, a terminal is further provided. The terminal includes a processor and a memory. The memory is configured to store at least one instruction, at least one program, a code set, or an instruction set thereon which, when loaded and executed by the processor, causes the processor to implement the method of the various method implementations.

According to implementations of the disclosure, a non-transitory computer-readable storage medium is further provided. The non-transitory computer-readable storage medium is configured to store at least one instruction, at least one program, a code set, or an instruction set thereon which, when loaded and executed by the processor, causes the processor to implement the method of the various method implementations.

Figure 8:
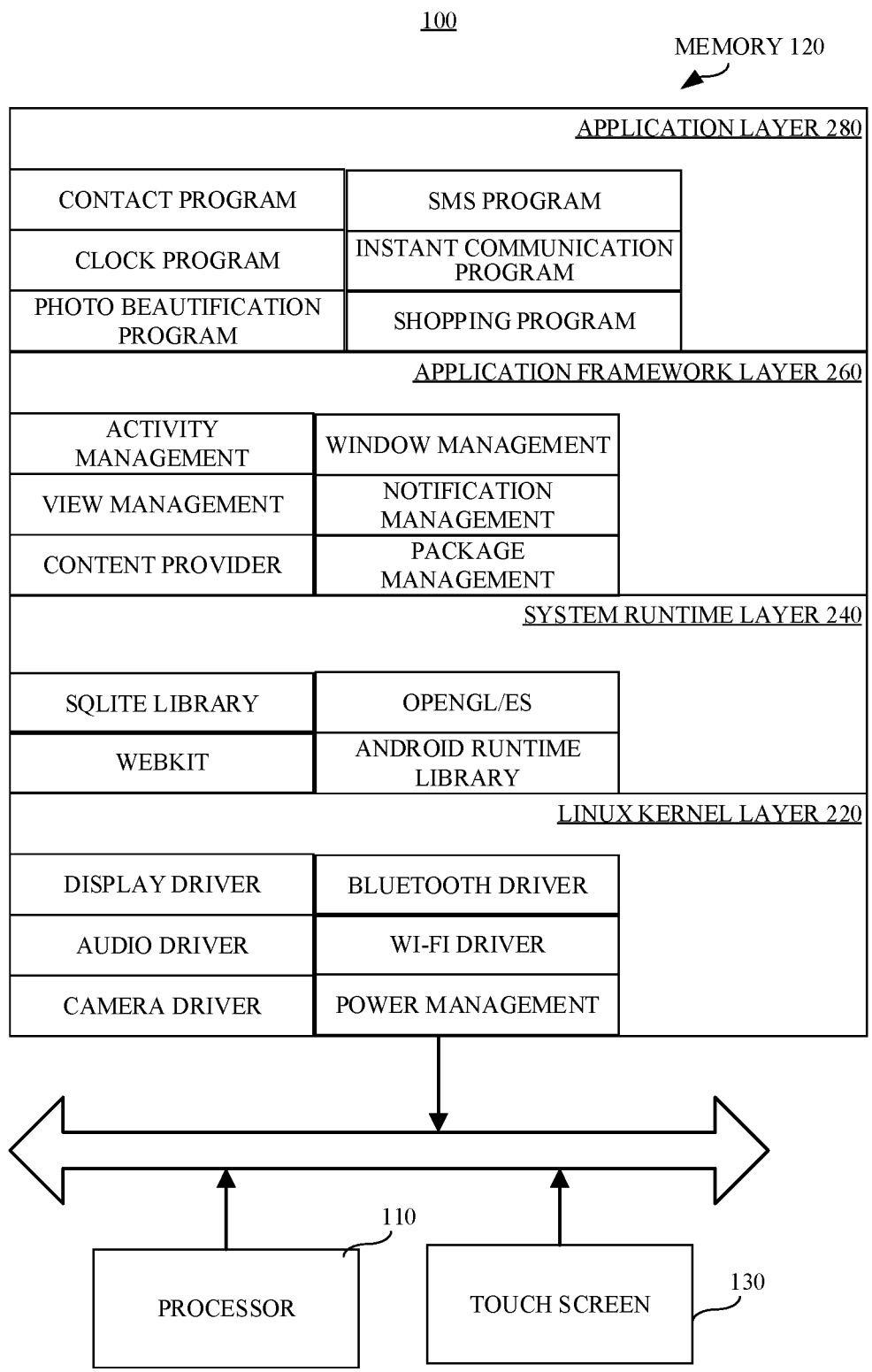
FIG. 8 is a schematic structural diagram illustrating a terminal according to implementations.
Figure 9:
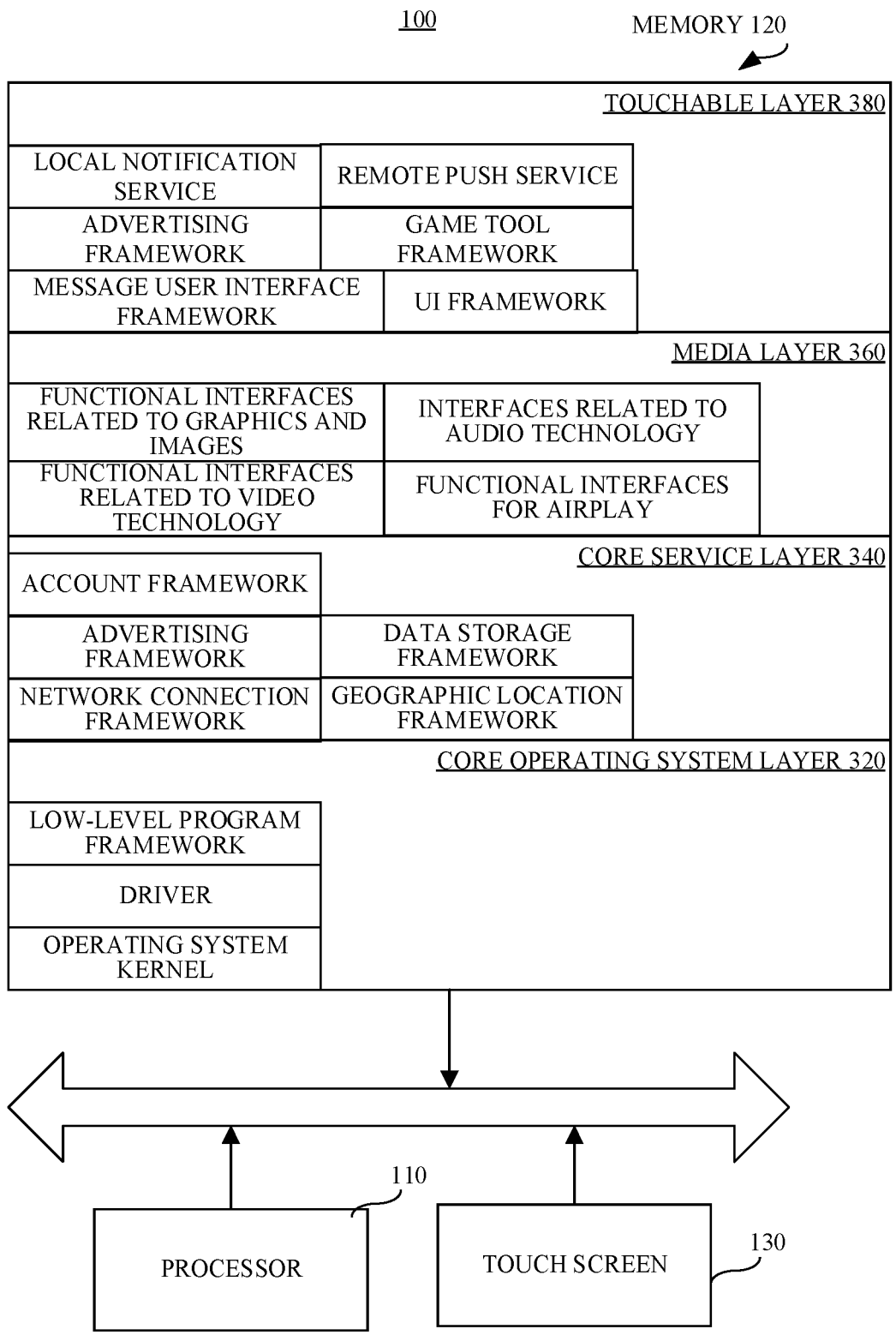
FIG. 9 is a schematic structural diagram illustrating a terminal according to implementations.

Referring to FIG. 8 and FIG. 9, it shows a structural block diagram of a terminal 100 according to an example implementation. The terminal 100 can be a mobile phone, a tablet computer, a notebook computer, an e-book, or the like. The terminal 100 in the present disclosure can include one or more of the following components: a processor 110, a memory 120, and a touch screen 130.

The processor 110 can include one or more processing cores. The processor 110 connects various parts of the entire terminal 100 by using various interfaces and lines, and executes or performs the instructions, programs, code sets, or instruction sets stored in the memory 120, and deploys the data stored in the memory 120, to execute various functions and processing data of terminal 100. In an example, the processor 110 can use at least one hardware form of digital signal processing (DSP), field-programmable gate array (FPGA), and programmable logic array (PLA) to implement. The processor 110 may integrate one or a combination of a central processing unit (CPU), a graphics processing unit (GPU), and a modem. The CPU is mainly configured to handle the operating system, user interface, and application programs; the GPU is responsible for rendering and drawing the content to be displayed by the touch screen 130; and the modem is used for processing wireless communication. It can be understood that the modem may not be integrated into the processor 110 and may be implemented by a single chip.

The memory 120 may include random access memory (RAM) and may also include read-only memory (ROM). In an example, the memory 120 includes a non-transitory computer-readable storage medium. The memory 120 may be used to store instructions, programs, codes, code sets, or instruction sets. The memory 120 may include a storage program area and a storage data area, where the storage program area may store instructions for implementing an operating system, instructions for at least one function (such as a touch function, a sound playback function, an image playback function, etc.), and instructions for implementing the following method implementations; the storage data area may store data (such as audio data, phone book) created according to the use of terminal 100.

Taking the operating system of an Android system as an example, the programs and data stored in the memory 120 are illustrated in FIG. 8. The memory 120 stores a Linux kernel layer 220, a system runtime layer 240, an application framework layer 260, and an application layer 280. The Linus kernel layer 220 provides low-level drivers for various hardware of the terminal 100, such as display drivers, audio drivers, camera drivers, Bluetooth drivers, Wi-Fi (wireless fidelity) drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library is also provided in the system runtime layer 240, which mainly provides some core libraries for allowing developers to write Android applications using the Java language. The application framework layer 260 provides various APIs that may be used when building application programs. Developers can also use these APIs to build their own applications, such as activity management, window management, view management, notification management, content providers, package management, call management, resource management, and location management. There is at least one application running in the application layer 280. These applications can be contact programs, SMS programs, clock programs, camera applications, etc. that are native to the operating system; they can also be applications developed by third-party developers, such as instant communication programs, photo beautification programs, etc.

Taking the operating system of an IOS system as an example, the programs and data stored in the memory 120 are illustrated in FIG. 9. The IOS system includes: a core operating system layer 320, a core service layer 340, a media layer 360, and a touchable layer (also called Cocoa touch layer) 380. The core operating system layer 320 includes an operating system kernel, drivers, and low-level program frameworks. These low-level program frameworks provide functions closer to the hardware for use by the program framework located at the core service layer 340. The core service layer 340 provides system services and/or program frameworks required by the application program, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and AirPlay interfaces for audio and video transmission technologies. The touchable layer 380 provides various commonly-used interface-related frameworks for application development. The touchable layer 380 is responsible for user touch interactive operations on the terminal 100. For example, a local notification service, a remote push service, an advertising framework, a game tool framework, a message user interface (UI) framework, a user interface UIKit framework, a map framework, and so on.

Among the frameworks illustrated in FIG. 9, frameworks related to most applications include, but are not limited to: a basic framework in the core service layer 340 and a UIKit framework in the touchable layer 380. The basic framework provides many basic object classes and data types and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch screen 130 is used for receiving a touch operation by a user using a finger, a touch pen, or any suitable object on or nearby, and a user interface displaying various applications. The touch screen 130 is usually disposed on the front panel of the terminal 100. The touch screen 130 may be designed as a full screen, a curved screen, or a special-shaped screen. The touch screen 130 can also be designed as a combination of a full screen and a curved screen, and a combination of a special-shaped screen and a curved screen, which is not limited in this example.

Full Screen

Figure 10:
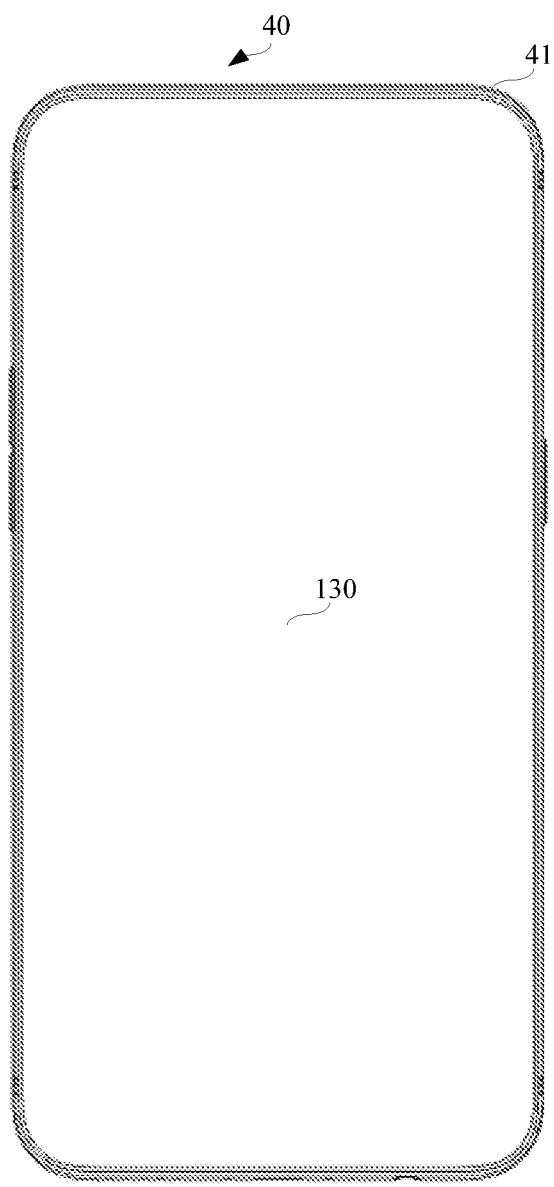
FIG. 10 is a schematic structural diagram illustrating a terminal according to implementations.

The full screen may refer to a screen design in which the touch screen 130 occupies the front panel of the terminal 100 with a screen ratio exceeding a threshold (such as 80% or 90% or 95%). One calculation method of the screen ratio is: (the area of the touch screen 130/the area of the front panel of the terminal 100)*100%; another way to calculate the screen ratio is: (the area of the actual display area in the touch screen 130/the area of the front panel of the terminal 100)*100%; still another way to calculate the screen ratio is: (the diagonal of touch screen 130/the diagonal of the front panel of the terminal 100)*100%. In the schematic example illustrated in FIG. 10, almost all areas on the front panel of the terminal 100 are touch screen 130. On the front panel 40 of the terminal 100, all areas other than the edges generated by the middle frame 41 are all touch screen 130. The four corners of the touch screen 130 may be right-angled or rounded.

The full screen may also be a screen design in which at least one front panel component is integrated inside or below the touch screen 130. In an example, the at least one front panel component includes a camera, a fingerprint sensor, a proximity light sensor, a distance sensor, and the like. In some examples, other components on the front panel of the related terminal are integrated in all or part of the touch screen 130. For example, after the photosensitive element in the camera is split into multiple photosensitive pixels, the pixels are integrated in a black area in each display pixel in the touch screen 130. Since the at least one front panel component is integrated inside the touch screen 130, the full screen has a higher screen ratio.

In other examples, the front panel components on the front panel of the related terminal can also be set on the side or back of the terminal 100, such as placing an ultrasonic fingerprint sensor under the touch screen 130, or a bone-conducting earpiece inside the terminal 100, and the camera arranged on the side of the terminal 100 in a pluggable structure.

In some examples, when the terminal 100 uses a full screen, a single side, or two sides (such as left and right sides), or four sides (such as top, bottom, left, and right sides) of the middle frame of the terminal 100 are provided with edge touch sensors 120. The edge touch sensors 120 are used to detect at least one of a user's touch operation, click operation, press operation, and slide operation on the middle frame. The edge touch sensor 120 may be any one of a touch sensor, a thermal sensor, and a pressure sensor. The user can apply operations on the edge touch sensor 120 to control applications in the terminal 100.

Curved Screen

Figure 11:
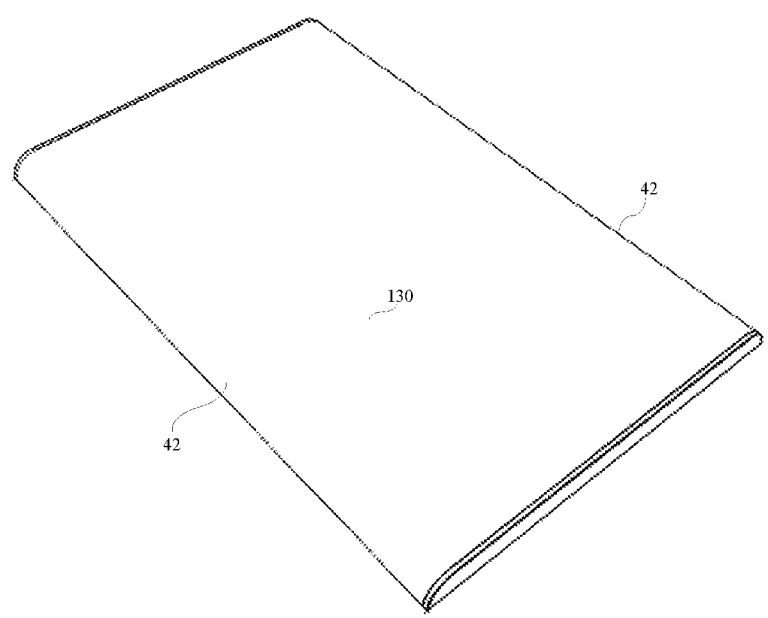
FIG. 11 is a schematic structural diagram illustrating a terminal according to implementations.

The curved screen refers to a screen design in which the screen area of the touch screen 130 is not in a plane. Generally, a curved screen has at least one cross section: the cross section has a curved shape, and the projection of the curved screen in any plane direction perpendicular to the cross section is a flat screen design. The curved shape may be U-shaped. In an example, the curved screen refers to a screen design manner in which at least one side is a curved shape. In an example, the curved screen refers to that at least one side of the touch screen 130 extends to cover the middle frame of the terminal 100. Since the side of the touch screen 130 extends to cover the middle frame of the terminal 100, the middle frame without the display function and the touch function is also covered as a displayable area and/or an operable area, so that the curved screen has a higher screen ratio. In an example, in the example illustrated in FIG. 11, the curved screen refers to a screen design in which the left and right sides 42 are curved; or, the curved screen refers to a screen design in which the upper and lower sides are curved; or, curved screen refers to a screen design with four curved sides on the top, bottom, left, and right. In another example, the curved screen is made of a touch screen material with a certain flexibility.

Special-Shaped Screen

The special-shaped screen is a touch screen with an irregular shape. The irregular shape is not a rectangle or a rounded rectangle. In an example, the special-shaped screen refers to a screen design provided with protrusions, notches, and/or holes on the rectangular or rounded rectangular touch screen 130. In an example, the protrusion, the notch, and/or the hole can be located at the edge of the touch screen 130, the center of the screen, or both. When the protrusion, notch, and/or hole are set on one edge, they can be set at the middle position or both ends of the edge; when the protrusion, notch, and/or hole are set on the center of the screen, they can be set in one or more of the areas: the upper area, the upper left area, the left area, the lower left area, the lower area, the lower right area, the right area, and the upper right area of the screen. When arranged in multiple areas, the protrusions, the notches, and the holes can be distributed in a centralized or distributed manner; they can be distributed symmetrically or asymmetrically. The number of the protrusions, the notches, and/or the holes is not limited.

Because the special-shaped screen covers the upper and/or lower forehead area of the touch screen as a displayable area and/or an operable area, so that the touch-screen display takes up more space on the front panel of the terminal, having a larger screen ratio. In some examples, the notches and/or holes are used to receive at least one front panel component, which includes at least one of a camera, a fingerprint sensor, a proximity light sensor, a distance sensor, handset, an ambient light sensor, or physical buttons.

Figure 12:
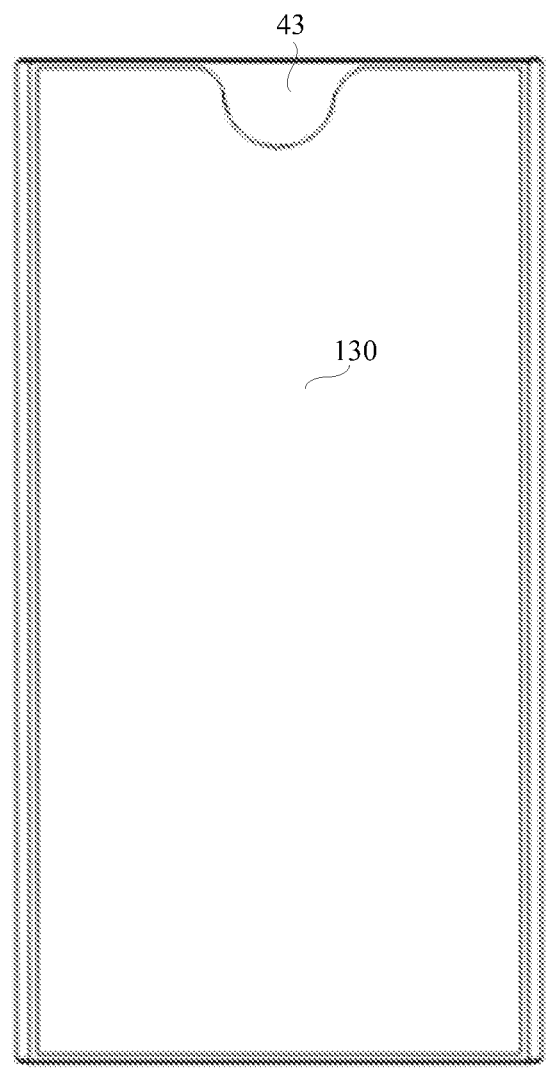
FIG. 12 is a schematic structural diagram illustrating a terminal according to implementations.
Figure 13:
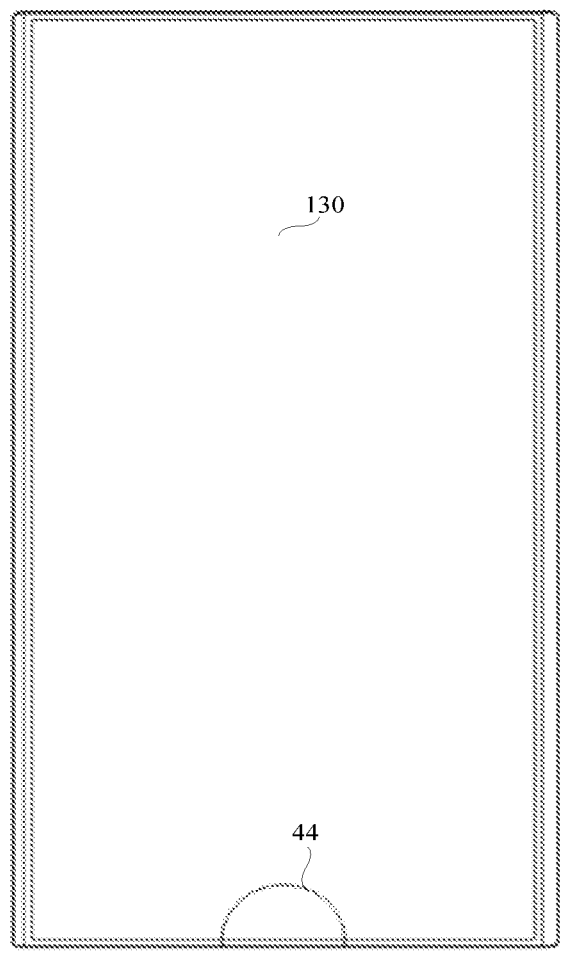
FIG. 13 is a schematic structural diagram illustrating a terminal according to implementations.
Figure 14:
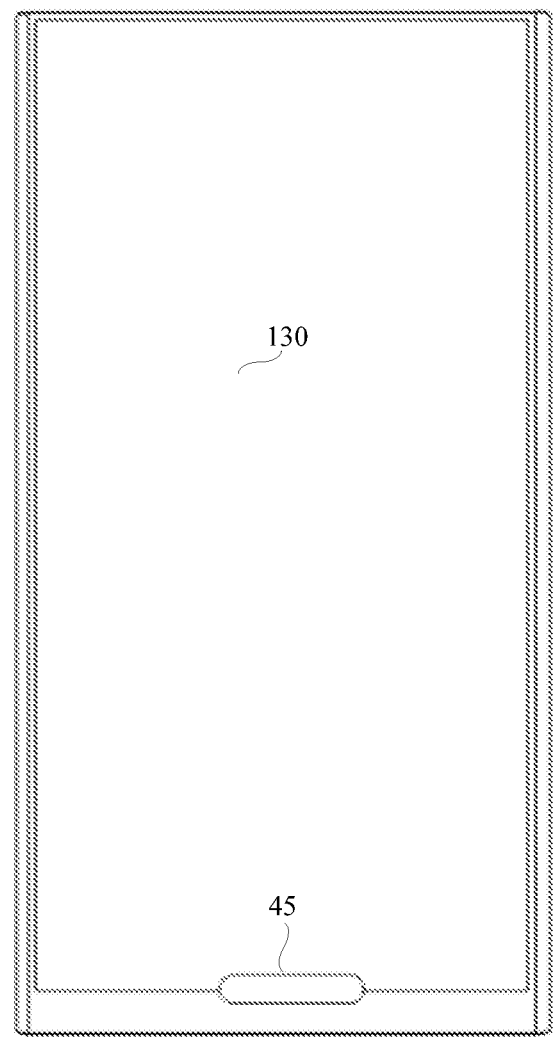
FIG. 14 is a schematic structural diagram illustrating a terminal according to implementations.
Figure 15:
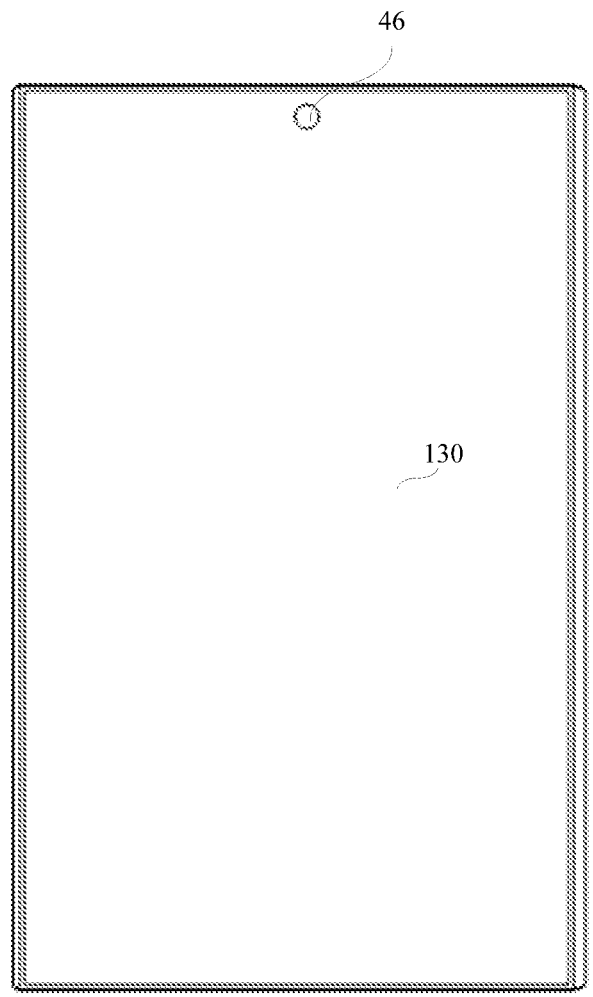
FIG. 15 is a schematic structural diagram illustrating a terminal according to implementations.

Schematically, the notch may be provided on one or more edges, and the notch may be a semi-circular notch, a right-angled rectangular notch, a rounded rectangular notch, or an irregularly-shaped notch. In the example illustrated schematically in FIG. 12, the special-shaped screen may be a screen design provided with a semi-circular notch 43 at the center of the upper edge of the touch screen 130. The space vacated by the semi-circular notch 43 is used for accommodating at least one front panel component of a camera, a distance sensor (also known as a proximity sensor), a handset, and an ambient light brightness sensor. As illustrated in FIG. 13, the special-shaped screen may be designed that a semi-circular notch 44 is located on the central position of the lower edge of the touch screen 130. The space vacated by the semi-circular notch 44 is used to accommodate at least one component of a physical button, a fingerprint sensor, and a microphone. As illustrated in the example of FIG. 14, the special-shaped screen may be a screen design provided with a semi-elliptical notch 45 in the center of the lower edge of the touch screen 130. A semi-elliptical notch is formed on the front panel of the terminal 100, and two semi-elliptical notches surround to form an elliptical area. The elliptical area is used to accommodate physical keys or fingerprint identification modules. In the example illustrated in FIG. 15, the shaped screen can be a screen design having at least one small hole 46 in the upper half of the touch screen 130, and the space vacated by the small hole 46 is used to accommodate at least one front panel component of a camera, a distance sensor, a handset, and an ambient light sensor.

In addition, those skilled in the art can understand that the structure of the terminal 100 illustrated in the above figures does not constitute a limitation on the terminal 100. The terminal may include more or fewer components than illustrated in the drawings, or combine certain components, or different component arrangements. For example, the terminal 100 further includes components such as a radio frequency circuit, an input unit, a sensor, an audio circuit, a WI-FI module, a power supply, and a Bluetooth module, and details are not described herein again.

According to the implementations, the preview image is acquired through the capturing component and the exposure parameter value corresponding to the preview image is acquired; the image capturing parameter value in the current HDR scene is forecasted according to the preview image, the exposure parameter value, and the pre-trained forecasting model, where the image capturing parameter includes the number of images for synthesis; an image is captured according to the image capturing parameter value forecasted upon receiving the capturing instruction. In this way, the terminal can automatically compute the number of images for synthesis in current HDR scene, and capture an image based on the number of images for synthesis, without requiring a user to manually turn on an HDR synthesis function, thereby improving the efficiency of taking photos.

A person of ordinary skill in the art can understand that all or part of the steps of implementing the foregoing implementations can be implemented by hardware or can be instructed by a program to complete related hardware. The program can be stored in a computer-readable storage medium. The storage medium mentioned can be a read-only memory, a magnetic disk, or an optical disk.

The above are only some implementations of the present application and are not intended to limit the present application. Any change, equivalent modification, or improvement made within the spirit and principle of this application shall be included in the protection scope of this application.

What is claimed is:

1. A method for capturing images, comprising:
   acquiring a reference preview image through a capturing component of a terminal and acquiring a reference exposure parameter value corresponding to the reference preview image;
   forecasting a final image capturing parameter value in a current high dynamic range (HDR) scene according to the reference preview image, the reference exposure parameter value, and an image capturing parameter related pre-trained forecasting model with an image data parameter, an exposure parameter, and an image capturing parameter as variables, wherein the image capturing parameter comprises a number of images for synthesis; and
   capturing an image according to the final image capturing parameter value forecasted, upon receiving a capturing instruction.

2. The method of claim 1, wherein the final image capturing parameter further comprises a final exposure parameter.

3. The method of claim 1, further comprising:
   training the forecasting model in such a manner that a forecasted image capturing parameter value corresponding to a training preview image and a training exposure parameter value approaches a pre-stored training image capturing parameter value, to obtain the pre-trained forecasting model with the image data parameter, the exposure parameter, and the image capturing parameter as variables, wherein the training is performed according to a pre-stored correspondence relationship between training preview images, training exposure parameter values, and training image capturing parameter values in a training set.

4. The method of claim 3, further comprising:
   acquiring a first preview image through the capturing component, and acquiring a first exposure parameter value corresponding to the first preview image, wherein the training preview images of the pre-stored correspondence relationship in the training set comprises the first preview image;
   determining a first preset number of exposure parameter values and a second preset number of exposure parameter values according to the first exposure parameter value, a first preset number of attenuation percentages, and a second preset number of enhancement percentages;
   obtaining a first preset number of preview images through the capturing component according to each of the first preset number of exposure parameter values, and obtaining a second preset number of preview images through the capturing component according to each of the second preset number of exposure parameter values;
   for each of a plurality of preset numbers of images for synthesis stored in advance,
     selecting the first preview image and selecting, from the first preset number of preview images and the second preset number of preview images, preview images the quantity of which is equal to the preset number minus one, to obtain a target preview image set corresponding to the preset number and at least one exposure parameter value, wherein the at least one exposure parameter value is selected from the first preset number of exposure parameter values and the second preset number of exposure parameter values; and
     performing image synthesis on the target preview image set to obtain a synthesized image corresponding to the preset number and the at least one exposure parameter value;
   determining, from synthesized images, a target synthesized image with best image quality, and determining a target preset number and at least one target exposure parameter value corresponding to the target synthesized image as target image capturing parameter values; and
   storing the first preview image, the first exposure parameter value, and the target image capturing parameter values into the training set correspondingly.

5. The method of claim 4, wherein performing the image synthesis on the target preview image set to obtain the synthesized image corresponding to the preset number and the at least one exposure parameter value comprises:
   performing the image synthesis on the target preview image set based on a plurality of preset terminal performance parameter values, to obtain the synthesized image corresponding to the preset number, the at least one exposure parameter value, and each of the plurality of preset terminal performance parameter values.

6. The method of claim 5, wherein determining, from the synthesized images, the target synthesized image with the best image quality, and determining the target preset number and the at least one target exposure parameter value corresponding to the target synthesized image as the target image capturing parameter values comprises:

determining, from the synthesized images, the target synthesized image with the best image quality, and determining the target preset number, the at least one target exposure parameter value, and a target preset terminal performance parameter value corresponding to the target synthesized image as the target image capturing parameter values.

7. The method of claim 4, further comprising:

recording a power consumption value of power consumed when the synthesized image corresponding to the preset number and the at least one exposure parameter value is obtained.

8. The method of claim 7, wherein determining, from the synthesized images, the target synthesized image with the best image quality, and determining the target preset number and the at least one target exposure parameter value corresponding to the target synthesized image as the target image capturing parameter values comprises:

determining, from the synthesized images, a target synthesized image which is optimal in terms of both image quality and power consumption value, and determining a target preset number and at least one target exposure parameter value corresponding to the target synthesized image which is optimal in terms of both image quality and power consumption value as the target image capturing parameter values.

9. The method of claim 5, wherein the preset terminal performance parameter value comprises a central processing unit (CPU) operating frequency.

10. The method of claim 1, wherein the preview image is an image acquired by the capturing component before a shutter button of the terminal is pressed.

11. A terminal, comprising:

at least one processor; and a non-transitory computer readable storage, coupled to the at least one processor and storing at least one computer executable instruction thereon which, when executed by the at least one processor, causes the at least one processor to:

acquire a reference preview image through a capturing component of a terminal and acquire a reference exposure parameter value corresponding to the reference preview image;

forecast a final image capturing parameter value in a current high dynamic range (HDR) scene according to the reference preview image, the reference exposure parameter value, and an image capturing parameter related pre-trained forecasting model with an image data parameter, an exposure parameter, and an image capturing parameter as variables, wherein the image capturing parameter comprises a number of images for synthesis; and capture an image according to the final image capturing parameter value forecasted, upon receiving a capturing instruction.

12. The terminal of claim 11, wherein the final image capturing parameter further comprises a final exposure parameter.

13. The terminal of claim 11, wherein the at least one processor is further configured to:

train the forecasting model in such a manner that a forecasted image capturing parameter value corresponding to a training preview image and a training exposure parameter value approaches a pre-stored training image capturing parameter value, to obtain the pre-trained forecasting model with the image data parameter, the exposure parameter, and the image capturing parameter as variables, wherein the training is performed according to a pre-stored correspondence relationship between training preview images, training exposure parameter values, and training image capturing parameter values in a training set.

14. The terminal of claim 13, wherein the at least one processor is further configured to:

acquire a first preview image through the capturing component, and acquire a first exposure parameter value corresponding to the first preview image, wherein the training preview images of the pre-stored correspondence relationship in the training set comprises the first preview image;

determine a first preset number of exposure parameter values and a second preset number of exposure parameter values according to the first exposure parameter value, a first preset number of attenuation percentages, and a second preset number of enhancement percentages;

obtain a first preset number of preview images through the capturing component according to each of the first preset number of exposure parameter values, and obtain a second preset number of preview images through the capturing component according to each of the second preset number of exposure parameter values;

for each of a plurality of preset numbers of images for synthesis stored in advance, select the first preview image and select, from the first preset number of preview images and the second preset number of preview images, preview images the quantity of which is equal to the preset number minus one, to obtain a target preview image set corresponding to the preset number and at least one exposure parameter value, wherein the at least one exposure parameter value is selected from the first preset number of exposure parameter values and the second preset number of exposure parameter values, and to perform image synthesis on the target preview image set to obtain a synthesized image corresponding to the preset number and the at least one exposure parameter value;

determine, from synthesized images, a target synthesized image with best image quality, and determine a target preset number and at least one target exposure parameter value corresponding to the target synthesized image as target image capturing parameter values; and store the first preview image, the first exposure parameter value, and the target image capturing parameter values into the training set correspondingly.

15. The terminal of claim 14, wherein the at least one processor configured to perform the image synthesis on the target preview image set to obtain the synthesized image corresponding to the preset number and the at least one exposure parameter value is configured to:

perform the image synthesis on the target preview image set based on a plurality of preset terminal performance parameter values, to obtain the synthesized image corresponding to the preset number, the at least one exposure parameter value, and each of the plurality of preset terminal performance parameter values.

16. The terminal of claim 15, wherein the at least one processor configured to determine, from the synthesized images, the target synthesized image with the best image quality, and determine the target preset number and the at least one target exposure parameter value corresponding to the target synthesized image as the target image capturing parameter values is configured to:
   determine, from the synthesized images, the target synthesized image with the best image quality, and determine the target preset number, the at least one target exposure parameter value, and a target preset terminal performance parameter value corresponding to the target synthesized image as the target image capturing parameter values.

17. The terminal of claim 14, wherein the at least one processor is further configured to:
   record a power consumption value of power consumed when the synthesized image corresponding to the preset number and the at least one exposure parameter value is obtained.

18. The terminal of claim 17, wherein the at least one processor configured to determine, from the synthesized images, the target synthesized image with the best image quality, and determine the target preset number and the at least one target exposure parameter value corresponding to the target synthesized image as the target image capturing parameter values is configured to:
   determine, from the synthesized images, a target synthesized image which is optimal in terms of both image quality and power consumption value, and determine a target preset number and at least one target exposure parameter value corresponding to the target synthesized image which is optimal in terms of both image quality and power consumption value as the target image capturing parameter values.

19. The terminal of claim 15, wherein the preset terminal performance parameter value comprises a central processing unit (CPU) operating frequency.

20. A non-transitory computer readable storage medium storing a computer program which, when executed by a processor, causes the processor to:
   acquire a reference preview image through a capturing component of a terminal and acquire a reference exposure parameter value corresponding to the reference preview image;
   forecast a final image capturing parameter value in a current high dynamic range (HDR) scene according to the reference preview image, the reference exposure parameter value, and an image capturing parameter related pre-trained forecasting model with an image data parameter, an exposure parameter, and an image capturing parameter as variables, wherein the image capturing parameter comprises a number of images for synthesis; and
   capture an image according to the final image capturing parameter value forecasted, upon receiving a capturing instruction.

* * * * *